(12) United States Patent
Park et al.

(10) Patent No.: US 10,419,925 B2
(45) Date of Patent: Sep. 17, 2019

(54) METHOD AND DEVICE FOR MANAGING MOBILITY IN IP BASED NETWORK

(71) Applicant: Samsung Electronics Co., Ltd., Suwon-si, Gyeonggi-do (KR)

(72) Inventors: Jung-Shin Park, Seoul (KR); Yegin Alper, Istanbul (TR); Dae-Gyun Kim, Seongnam-si (KR); Won-Il Roh, Yongin-si (KR); Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1044 days.

(21) Appl. No.: 14/268,705

(22) Filed: May 2, 2014

(65) Prior Publication Data

US 2014/0328317 A1 Nov. 6, 2014

(30) Foreign Application Priority Data

May 2, 2013 (KR) .................. 10-2013-0049600

(51) Int. Cl.
| | | |
|---|---|---|
| *H04W 8/26* | (2009.01) | |
| *H04L 29/12* | (2006.01) | |
| *H04W 8/08* | (2009.01) | |
| *H04W 80/04* | (2009.01) | |
| *H04W 36/00* | (2009.01) | |

(52) U.S. Cl.
CPC ........... *H04W 8/26* (2013.01); *H04L 61/2007* (2013.01); *H04L 61/2038* (2013.01); *H04W 8/085* (2013.01); *H04W 36/0016* (2013.01); *H04W 80/04* (2013.01)

(58) Field of Classification Search
CPC ........... H04M 1/72527; H04M 1/7253; H04W 52/0258; H04W 52/0296; H04W 92/00; H04W 36/0077; H04W 80/04; H04W 8/085; H04W 8/26

USPC .................. 370/331, 342; 709/239
See application file for complete search history.

(56) References Cited

U.S. PATENT DOCUMENTS

| | | | | |
|---|---|---|---|---|
| 5,956,681 A | * | 9/1999 | Yamakita ......... | H04M 1/72552 704/231 |
| 6,424,657 B1 | * | 7/2002 | Voit ....................... | H04L 47/10 370/412 |
| 6,501,746 B1 | * | 12/2002 | Leung ............... | H04L 29/12009 370/338 |
| 6,681,232 B1 | * | 1/2004 | Sistanizadeh ....... | H04L 41/0213 |

(Continued)

FOREIGN PATENT DOCUMENTS

| | | |
|---|---|---|
| CN | 101027889 A | 8/2007 |
| WO | 2012/116252 A2 | 8/2012 |
| WO | 2012-170127 A1 | 12/2012 |

OTHER PUBLICATIONS

Korean Office Action dated Mar. 28, 2019, issued in the Korean Application No. 10-2013-0049600.

*Primary Examiner* — Andrew Lai
*Assistant Examiner* — Andrew C Lee
(74) *Attorney, Agent, or Firm* — Jefferson IP Law, LLP

(57) ABSTRACT

A method and a device for managing mobility of a mobile station in an Internet Protocol (IP) based network are provided. The method includes receiving a request for allocation of an IP address from an application, determining a type of IP address to be allocated to the application based on the request for the allocation of the IP address, and allocating the determined type of IP address to the application.

21 Claims, 6 Drawing Sheets

(56) References Cited

U.S. PATENT DOCUMENTS

| | | | | |
|---|---|---|---|---|
| 6,771,673 | B1* | 8/2004 | Baum | H04L 29/12009<br>370/535 |
| 6,987,961 | B1* | 1/2006 | Pothana | G06F 15/167<br>455/412.1 |
| 7,006,472 | B1* | 2/2006 | Immonen | H04L 29/12009<br>370/332 |
| 7,047,313 | B1* | 5/2006 | Broerman | H04L 29/06<br>709/238 |
| 7,079,499 | B1* | 7/2006 | Akhtar | H04L 63/08<br>370/310 |
| 7,133,404 | B1* | 11/2006 | Alkhatib | H04L 29/12009<br>370/392 |
| 7,197,549 | B1 | 3/2007 | Salama et al. | |
| 7,668,941 | B1* | 2/2010 | Kathandapani | H04L 29/12839<br>709/217 |
| 8,636,735 | B2* | 1/2014 | Scopton | A61B 18/1492<br>606/48 |
| 8,638,735 | B2* | 1/2014 | Holt | G07F 17/32<br>370/329 |
| 8,892,724 | B1* | 11/2014 | Bertz | H04W 8/26<br>709/203 |
| 2002/0044567 | A1* | 4/2002 | Voit | H04L 47/2408<br>370/467 |
| 2002/0112076 | A1* | 8/2002 | Rueda | H04L 12/14<br>709/245 |
| 2003/0179750 | A1* | 9/2003 | Hasty, Jr. | H04L 29/12018<br>370/390 |
| 2004/0090958 | A1* | 5/2004 | Park | H04L 29/06<br>370/389 |
| 2004/0249974 | A1* | 12/2004 | Alkhatib | H04L 29/12349<br>709/245 |
| 2006/0028998 | A1* | 2/2006 | Lioy | H04L 69/167<br>370/252 |
| 2006/0143703 | A1* | 6/2006 | Hopen | G06F 21/6218<br>726/15 |
| 2007/0019670 | A1* | 1/2007 | Falardeau | H04W 48/18<br>370/465 |
| 2007/0058582 | A1* | 3/2007 | Park | H04L 29/12207<br>370/329 |
| 2007/0168475 | A1* | 7/2007 | Mullahy | H04L 45/00<br>709/220 |
| 2008/0101315 | A1* | 5/2008 | Bachmutsky | H04W 28/08<br>370/342 |
| 2008/0198804 | A1* | 8/2008 | Rahman | H04W 36/0011<br>370/331 |
| 2008/0219218 | A1* | 9/2008 | Rydnell | H04W 92/02<br>370/331 |
| 2008/0232272 | A1* | 9/2008 | Gelbman | H04L 29/12028<br>370/254 |
| 2008/0304421 | A1* | 12/2008 | Ramasubramanian | H04L 41/147<br>370/251 |
| 2009/0168787 | A1* | 7/2009 | Ansari | H04L 12/66<br>370/401 |
| 2009/0257425 | A1 | 10/2009 | Sastry et al. | |
| 2009/0262733 | A1* | 10/2009 | Olson | H04L 12/66<br>370/389 |
| 2009/0285175 | A1* | 11/2009 | Nix | H04L 29/125<br>370/331 |
| 2010/0138551 | A1* | 6/2010 | Degaonkar | H04L 29/12066<br>709/228 |
| 2010/0215019 | A1* | 8/2010 | Velev | H04W 8/06<br>370/331 |
| 2010/0268583 | A1* | 10/2010 | Backman | G06Q 30/0241<br>705/14.4 |
| 2010/0290417 | A1 | 11/2010 | Lin et al. | |
| 2010/0316018 | A1* | 12/2010 | Turanyi | H04L 12/5692<br>370/331 |
| 2011/0013562 | A1* | 1/2011 | Levkowetz | H04W 8/08<br>370/328 |
| 2011/0153831 | A1* | 6/2011 | Mutnuru | H04L 29/12066<br>709/226 |
| 2011/0176531 | A1* | 7/2011 | Rune | H04W 76/22<br>370/338 |
| 2011/0238822 | A1* | 9/2011 | Weniger | H04W 80/045<br>709/224 |
| 2011/0242975 | A1* | 10/2011 | Zhao | H04L 29/12216<br>370/230 |
| 2011/0295940 | A1* | 12/2011 | Saleem | H04L 29/12066<br>709/203 |
| 2012/0102169 | A1* | 4/2012 | Yu | H04L 67/18<br>709/223 |
| 2012/0127974 | A1* | 5/2012 | Doppler | H04W 76/02<br>370/338 |
| 2012/0144062 | A1* | 6/2012 | Livet | H04L 45/24<br>709/239 |
| 2012/0173646 | A1* | 7/2012 | Lan | H04L 12/56<br>709/206 |
| 2012/0271938 | A1* | 10/2012 | Livet | H04W 60/005<br>709/224 |
| 2012/0309389 | A1* | 12/2012 | Olson | H04L 12/66<br>455/426.1 |
| 2012/0317268 | A1 | 12/2012 | Akhtar et al. | |
| 2013/0097329 | A1* | 4/2013 | Alex | H04L 61/1511<br>709/228 |
| 2014/0219242 | A1* | 8/2014 | Perras | H04W 8/082<br>370/331 |

* cited by examiner

METHOD AND DEVICE FOR MANAGING MOBILITY IN IP BASED NETWORK

CROSS-REFERENCE TO RELATED APPLICATION(S)

This application claims the benefit under 35 U.S.C. § 119(a) of a Korean patent application filed on May 2, 2013 in the Korean Intellectual Property Office and assigned Serial number 10-2013-0049600, the entire disclosure of which is hereby incorporated by reference.

TECHNICAL FIELD

The present disclosure relates to a method and a device for managing mobility of a mobile station in a network. More particularly, the present disclosure relates to a method and a device for managing mobility of a mobile station in an Internet Protocol (IP) based network.

BACKGROUND

Third Generation (3G) or Fourth Generation (4G) communication network systems based on the Third Generation Partnership Project (3GPP), 3GPP2, and WiMAX standards are designed to provide an Internet Protocol (IP) access function to a Mobile Station (MS). Such communication network systems configure one or more IP addresses for the mobile station, provide a transmission interface, and allow the mobile station to transmit/receive IP packets using the IP addresses. The IP packets pass through wireless and wired regions in the 3G or 4 G communication network before leaving for the Internet, oriented toward a final destination (e.g., a web server in a remote location).

Since the communication network systems are configured with mobile systems, the communication network systems also support mobility of the mobile station. This means that even though a point of attachment of the mobile station is changed from one wireless access point (e.g., a Base Station (BS)) to another wireless access point, the IP address of the mobile station is maintained to be the same as it was at a location where the mobile station was connected at that time, while the transport connection is being made. Such a function is necessary to maintain IP session continuity and IP reachability. The IP reachability refers to a reachable level of a remote peer when a new IP session is initialized by the remote peer.

If an IP address among end points is changed in a network when an IP session is in progress, common IP connections may not process the change and may also not stop the change. In a case where an IP address of a mobile station is changed, even though there is no IP session in progress, remote peers do not know the new IP address and therefore cannot reach the mobile station any more. The 3G or 4 G communication network systems allow the IP address of the mobile station to always remain the same, thereby providing continuity and reachability of the IP session. Such communication network systems provide static IP addresses to the mobile station using unique technologies.

A technology for providing an identical IP address to a mobile station entails allocating the IP address to the mobile station from a common pool managed by an exclusive entity (e.g., a Home Agent (HA) and a Packet data network GateWay (PGW)) in a core network of an operator. The HA/PGW are network nodes to which the allocated IP address belongs. This means that when a Corresponding Node (CN) transmits IP packets to the given IP address in the Internet, the packets can be automatically transmitted toward these network nodes (HA/PGW) by internet routers. The HA/PGW can intercept the IP packets for the mobile station providing services.

The next operation performed by the HA/PGW is to transmit the intercepted IP packets to any location where the mobile station is connected at that time. The location of the mobile station may be changed. Every time the mobile station changes a point of attachment, the mobile station transmits location information thereof to the HA/PGW so that the HA/PGW may always discern where the intercepted IP packets are to be sent. This method ensures that the IP packets always reach the mobile station regardless of the mobility and the location of the mobile station. This is referred to as anchoring. That is, the mobile station anchors the IP address thereof on the HA/PGW. In general, the anchoring is permanent, and the static IP address is allocated to the mobile station for an extended period of time and anchored to the core network.

FIG. 1 illustrates an example of permanent anchoring of an IP address in a core network according to the related art.

Referring to FIG. 1, first and second access networks 101 and 103 are exemplified. The first access network 101 has a hierarchical structure at a place where two base stations BS1 and BS2 are connected to an Access Router (AR) 101-1. The second access network 103 has only a base station (BS3) 103-1. In the second access network 103, the base station (BS3) 103-1 may include a function of the AR 101-1, for example, a function capable of allocating an IP address to a mobile station 10 and transmitting (forwarding/routing) IP packets. In the example of FIG. 1, a permanent IP address of the mobile station 10 for transmission/reception of IP packets between the mobile station 10 and a corresponding node 20 is anchored to an HA/PGW 102-1 in a core network 102. That is, FIG. 1 illustrates an example in which a data path between the mobile station 10 and the corresponding node 20 is made through the HA/PGW 102-1. Internet routing must be designed in such a way that the IP packets take an optimal data path when data is transmitted from one node to another node. However, in a case where the IP packets are transmitted to a third node such as the HA/PGW 102-1 as illustrated in FIG. 1, the data path cannot help but be made long. This is referred to as triangular routing (i.e., routing in which data packets between two nodes are transmitted via a fixed third point).

The triangular routing increases transmission latency of the IP packets. In the triangular routing, the IP packets must go through the longer data path and therefore it takes more time to transmit data packets to a final destination. Furthermore, in order to maintain a data path, the triangular routing requires an exclusive node such as the HA/PGW which can intercept packets instead of the mobile station and then send the packets to the mobile station at a current location. These exclusive nodes have to deal with a plurality of mobile stations at the same time. Accordingly, the exclusive nodes consume a large amount of power and require a large network capacity in order to connect the plurality of mobile stations to the Internet. Furthermore, this acts as a factor which increases address Capital Expenditure (CAPEX) and Operating Expenditure (OPEX) in the network.

In addition, unlike the routing method widely distributed in the Internet, current communication traffic is made through static nodes such as the HA/PGW. This causes failure of the data path between stations. As the communication traffic is made through the static nodes, internet routers cannot efficiently operate and reliability of the communication network is deteriorated.

Furthermore, the standby time, the increased costs, and the deteriorated reliability in the network act as loss in providing mobility of the mobile station. Accordingly, there is a need for an improved apparatus and method for efficiently managing mobility in an IP based network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a device for efficiently managing mobility in an Internet Protocol (IP) based network.

Another aspect of the present disclosure is to provide a method and a device for managing mobility which can efficiently allocate and manage an IP address based on an application in an IP based network.

In accordance with one aspect of the present disclosure, a method of managing mobility in an IP based network by a mobile station is provided. The method includes receiving a request for allocation of an IP address from an application, determining a type of IP address to be allocated to the application based on the request for the allocation of the IP address, and allocating the determined type of IP address to the application.

In accordance with another aspect of the present disclosure, a mobile station for managing mobility in an IP based network is provided. The mobile station includes an IP stack configured to receive a request for allocation of an IP address from an application, determine a type of IP address to be allocated to the application based on the request for the allocation of the IP address, and allocate the determined type of IP address to the application, and a mobile Application Programming Interface (API) arranged between the IP stack and at least one application.

In accordance with another aspect of the present disclosure, a device readable recording medium for substantially implementing a program of instructions which are to be executed by a device performing a method of managing mobility in an IP based network is provided. The method of managing mobility includes receiving a request for allocation of an IP address from an application, determining a type of IP address to be allocated to the application based on the request for the allocation of the IP address, and allocating the determined type of IP address to the application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
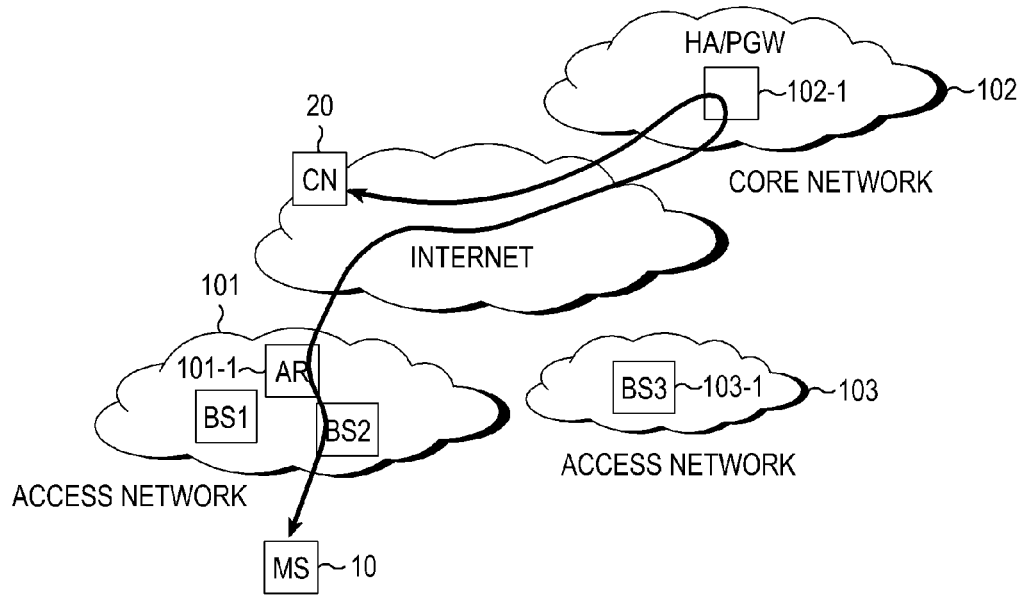
FIG. 1 illustrates an example of permanent anchoring of an Internet Protocol (IP) address in a core network according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments of the present disclosure propose a method of providing an enhanced Application Programming Interface (API) for allocating an Internet Protocol (IP) address to an application and managing the IP address between an IP stack and the applications included in a mobile station in view of a type of IP address.

In regard to the aforementioned proposal, the various embodiments of the present disclosure note that all applications used in the mobile station do not actually require the same level of mobility maintenance.

First, some applications act as a client and transmit/receive short bursts of IP packets. In this case, from the transmission of the first packet to the reception of the last packet, the entire IP session may be completed before a mobile station crosses a boundary between one or more base stations in an identical IP Access Router (AR). An example of such an application is an application having an instant messaging function. Here, the mobile station may have a permanent IP address over the IP session. When the mobile station moves from one Base Station (BS)/AR to another BS/AR while crossing the boundary between the base stations, the mobile station will be allocated another IP address. However, it does not matter since the IP session has already been terminated theretofore. The mobile station may use a new IP address for subsequent IP sessions.

Second, in some applications, an IP address may not be sufficiently permanent within an identical BS/AR. An IP session may continue while a mobile station is connected to the identical BS/AR. Downloading a web page may be one example. In this case, the mobile station will have to be basically provided with a permanent IP address even when changing the BS/AR by itself. In some respects, such a BS/AR acts in a similar way (a way of intercepting packets to be transmitted to the mobile station and sending the intercepted packets to a current location of the mobile station (belonging to another BS/AR)) for a Home Agent (HA) and a Packet data network GateWay (PGW) (HA/PGW). Such anchoring may be maintained while the IP session is being activated. If the IP session is terminated, the anchoring state may be released. This is an example of tentative anchoring.

Figure 2:
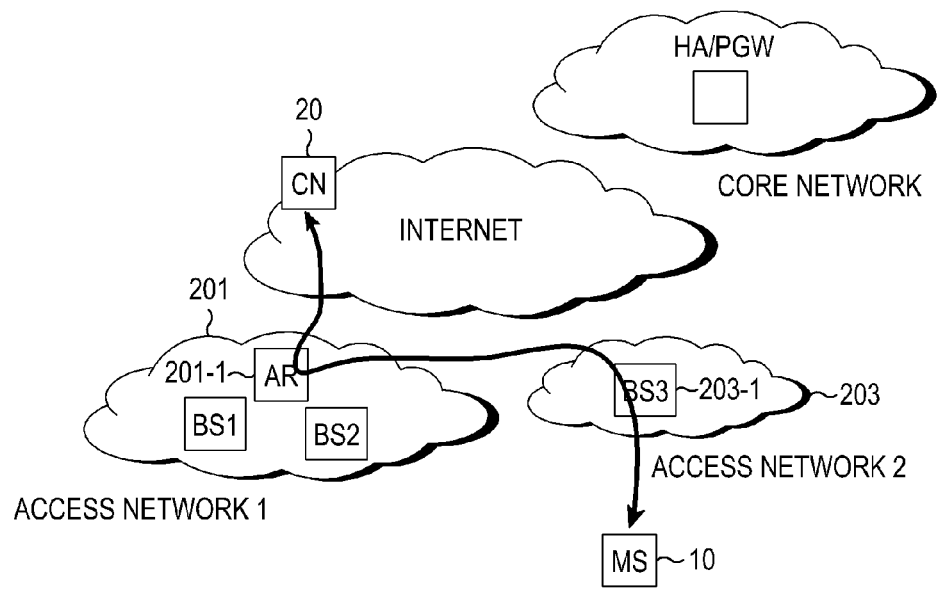
FIG. 2 is a view for describing an example of tentative anchoring according to an embodiment of the present disclosure.

FIG. 2 is a view for describing an example of tentative anchoring according to an embodiment of the present disclosure.

Referring to FIG. 2, it is assumed that an initialized IP session provided with a corresponding node 20 has already been initialized while a mobile station 10 was connected to one of base stations BS1 and BS2 through an AR 201-1 in a first access network 201. Thereafter, the mobile station 10 is connected to a third base station (BS3) 203-1 in a second access network 203 while the IP session between the mobile station 10 and the corresponding node 20 is still in progress. In order to permanently maintain the IP session, the AR 201-1 of the second access network 201 acts as an anchor point to allow IP packets to be transmitted to/from the mobile station 10 while the mobile station 10 is connected to the third base station (BS3) 203-1.

Third, another example of the application is a server application that must be able to reach an open IP address. An IP address of a server may be open to a Domain Name System (DNS). An IP address allocated to a node for providing the server application should always be constant. Such a type of application needs support of an HA/PGW.

However, all applications may not be included in all of the aforementioned examples and therefore, anchoring the applications to the HA/PGW may be extreme. It may be possible to find a more efficient solution based on the fact that an IP stack at a node for providing an application can selectively operate various types of anchoring methods.

When an application desires to initialize a communication state in the mobile station, a request for the IP stack is made. Such a request is processed through the IP stack such that one of available IP addresses configured in the IP stack is selected and the selected IP address may be used in the application.

However, in the existing mobility managing method, the application does not discriminate against the type of IP address selected through the IP stack and therefore, it is difficult to ensure efficient mobility management. In order to address this problem, the type of IP address requested by the application may be designated in the various embodiments of the present disclosure.

To this end, in the various embodiments of the present disclosure, the IP stack provides the designated type of IP address. If one or more IP addresses are designated to be used for the type of requested IP address, the IP stack selects one of IP addresses having the designated type. If there are no IP addresses available in the IP stack, the IP stack configures at least one IP address having the corresponding type and allows the configured IP address to be used by the related application.

The IP address having the type designated by the application depends on mobility necessary for the application. Some applications may also need an IP address that does not provide any support functions for mobility, access network anchoring, or core network anchoring.

The API proposed by the various embodiments of the present disclosure supports at least one of primitives (1) to (7) in regard to usage of the IP address.

(1) An Application Requests an IP Stack to Provide a Permanent IP Address.

The request (1) implies that the corresponding application needs an IP address anchored to a core network. However, if the permanent IP address is already available in the IP stack, the IP stack provides the permanent IP address to the application. If one or more permanent IP addresses are needed, the IP stack will select one of the plurality of permanent IP addresses. When the IP stack receives an allocation request for a specific type of IP address, if the corresponding IP address does not exist, the IP stack may perform an operation of configuring one IP address. Configuring a new home address by activating a dynamic IP address using a Home Agent (HA) is exemplified as the operation of configuring the IP address. If the IP address is successfully configured, the corresponding application may use the configured IP address.

(2) An Application Requests an IP Stack to Provide a Stable IP Address.

The request (2) implies that the application needs an IP address anchored to an access network. If the stable IP address is already available in the IP stack, the IP stack provides the stable IP address to the application. If one or more stable IP addresses are needed, the IP stack will select one of the stable IP addresses. When the IP stack receives an allocation request for the stable IP address, if such a stable IP address does not exist, the IP stack may perform an operation of configuring one IP address. For example, when the allocation request for the IP address is received from the application, the IP stack may have one IP address obtained from a serving BS/AR.

In general, the IP address obtained from the BS/AR needs to be un-configured (i.e., excluded) from the IP address configuration when a mobile station moves to another BS/AR. In the above-described case, if the IP address to be un-configured is notified by the anchored access network in response to the request of the application, the IP stack performs anchoring for the IP address to be un-configured when being handed over to another BS/AR. This implies that the IP stack must maintain the same IP address using the original BA/AR acting as an anchor node.

(3) An Application Requests an IP Stack to Provide a Local IP Address.

The request (3) implies that the application needs an IP address which is not anchored to any network. If the local IP address is already available in the IP stack, the IP stack provides the local IP address to the application. If one or more local IP addresses are needed, the IP stack will select one of the plurality of local IP addresses. If there are no local IP addresses when the IP stack receives the request, the IP stack may configure at least one IP address. For example, when the request for the local IP address is received from the application, the IP stack may retain only the anchored IP addresses. In this case, the IP stack will have to request an IP address from a serving BS/AR. The IP address allocated from an IP address pool of the BS/AR may be generally a disposable IP address. It may be structurally revised for a location in an IP communication network structure.

(4) An Application Requests an IP Stack to Provide any Type of IP Address.

The request (4) implies that the application does not discriminate against the type of the IP address. In this case, the IP stack provides any type of available IP address to the application. The primitive (4) related to usage of the IP address depends on what the currently running legacy application is.

(5) An Application Requests an IP Stack to Un-configure the Given IP Address.

The request (5) implies that the application does not need to use the IP address any more. Displaying the un-configuration of the IP address may be used by the IP stack un-configuring unnecessary resources. When the request for the IP address is received, if the IP address is not used by any application, the IP address is un-configured. Un-configuring the IP address may include a procedure of excluding the IP address from the IP stack and a procedure of sending a signal to anchor nodes when the IP address is the anchored IP address.

(6) An Application Requests Anchor Distance Information of the Given IP Address from an IP Stack.

When an IP address is anchored and a mobile station moves away from the anchor node, an anchor distance between a serving BS/AR and the anchor node is formed. The anchor distance may be expressed by the number of IP hops (i.e., the number of IP routers which a data packet must pass through before reaching the anchor node). For example, if there are three routers between the serving BS/AR and the anchor node BS/AR, the anchor distance is expressed by 4. If there is no router between the serving BS/AR and the anchor node BA/AR, the anchor distance is 1. When the anchored IP address is acquired from the serving BS/AR (since the application has requested the stable IP address before moving to another node yet), the anchor distance is displayed as zero. Furthermore, the anchor distance is represented in a format of a one-way transmission standby time between the serving BS/AR and the anchor node. The IP stack discerns a value of the standby time for the given IP address and the anchor node through periodic measurement. The application may use the anchor distance information to determine how far it will move to approach the anchor node. For example, when the anchored IP address is un-configured or the anchor distance is detected to exceed a reference, a new IP address may be configured.

(7) An Application Requests an IP Stack to Trigger the Application when an Anchor Distance of the Given IP Address Exceeds a Threshold Value.

The request (7) implies that the application desires the IP stack to notify of the fact that the anchor distance of the given IP address exceeds the threshold value provided by the application. The application un-configures the IP address using such a trigger and configures another IP address, thereby preventing the application performance from being deteriorated by the anchor distance.

Figure 3:
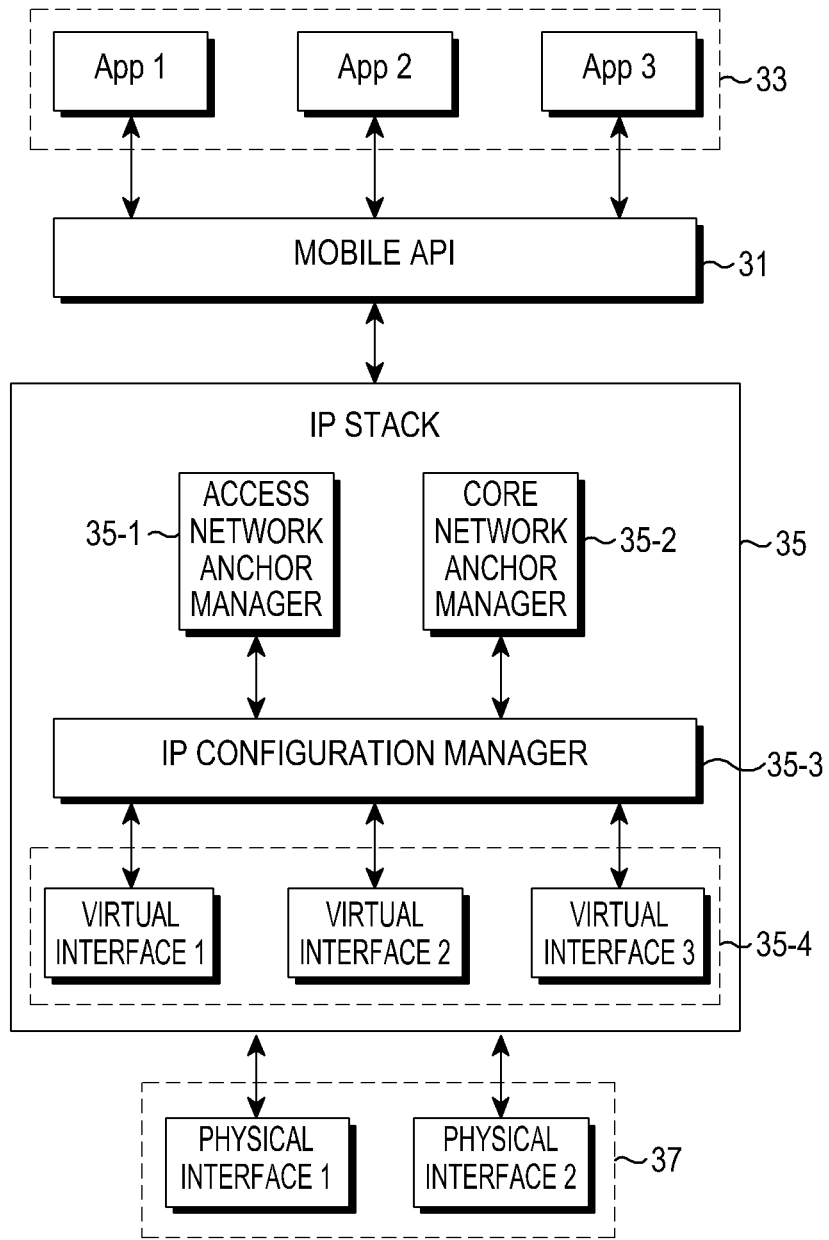
FIG. 3 is a block diagram functionally illustrating configurations of a mobile station including an IP stack according to an embodiment of the present disclosure.

FIG. 3 is a block diagram functionally illustrating configurations of a mobile station including an IP stack according to an embodiment of the present disclosure.

Referring to FIG. 3, a mobile API 31 is arranged between applications (App1, App2, and App3) 33 and an IP stack 35. Although three applications (App1, App2, and App3) 33 are illustrated in FIG. 3 for convenience, one or more applications may be simultaneously used in the mobile API 31. The IP stack 35 includes an access network anchor manager 35-1, a core network anchor manager 35-2, an IP configuration manager 35-3, and virtual interfaces 35-4. In FIG. 3, the IP configuration manager 35-3 serves to configure or exclude IP addresses by using methods according to the present disclosure which will be described below with reference to FIGS. 4 to 7.

In an embodiment of the present disclosure, the type of IP address is differentiated into a permanent IP address, a stable IP address, and a local IP address as described above. The permanent IP address is an IP address anchored to a core network, and the stable IP address is an IP address anchored to an access network. The local IP address is an IP address which is not anchored to any networks. According to the type of IP address, the IP configuration manager 35-3 controls such that the access network anchor manager 35-1 and the core network anchor manager 35-2 interact with each other. The permanent IP address is configured by performing an IP allocation procedure by the IP configuration manager 35-3 under the control of the core network anchor manager 35-2, and the stable IP address is configured by performing an IP allocation procedure by the IP configuration manager 35-3 under the control of the access network anchor manager 35-1. Since the local IP address is not anchored to any networks, the local IP address is configured by performing the IP allocation procedure by the IP configuration manager 35-3.

The access network anchor manager 35-1 and the core network anchor manager 35-2 perform protocol signaling for managing the IP addresses (the stable IP address and the permanent IP address) anchored to the access network and the core network. The access network anchor manager 35-1 performs signaling with an anchoring BS/AR in the access network, and the core network anchor manager 35-2 performs signaling with an HA/PGW in the core network. The IP addresses configured by the IP stack 35 are managed as virtual interfaces 35-4. According to time, there is no IP address which can be used in the IP stack, or one or more IP addresses may be used in the IP stack. Furthermore, the IP stack 35 may interface with physical interfaces 37 such as Wi-Fi, a 3G interface, and a 4G interface. The physical interfaces 37 provide connectivity to the mobile station. The one or more virtual interfaces 35-4 may be combined with the given physical interfaces 37 at one time, or no virtual interfaces may be combined with the given physical interfaces 37.

Figure 4:
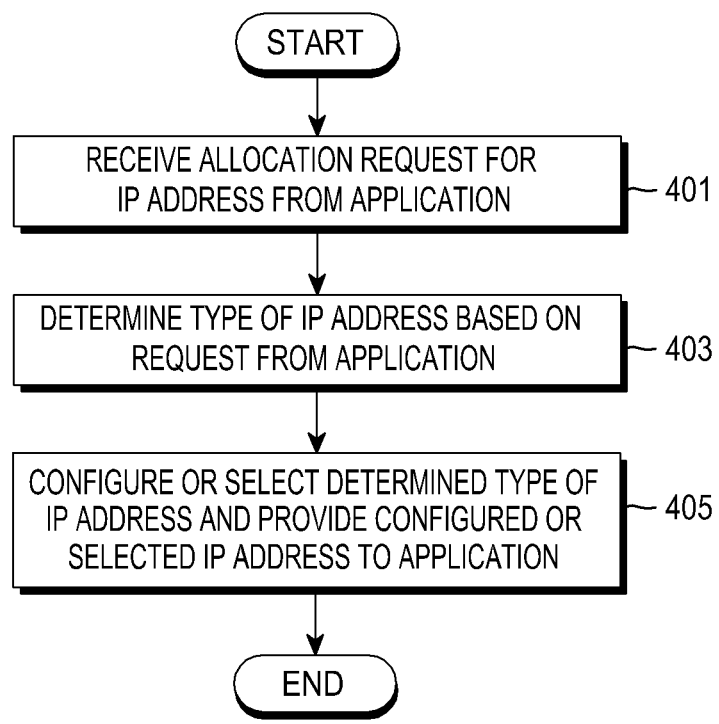
FIG. 4 is a flowchart illustrating a method of allocating an IP address to an application by an IP stack according to an embodiment of the present disclosure.

FIG. 4 is a flowchart illustrating a method of allocating an IP address to an application by an IP stack according to an embodiment of the present disclosure.

Referring to FIG. 4, the IP stack receives an allocation request for an IP address from an application in operation 401, and determines a type of IP address suitable for the application among a permanent IP address, a stable IP address, and a local IP address in operation 403. The IP stack configures or selects the determined type of IP address, and provides the configured or selected IP address to the application in operation 405.

In operation 403, the determining of the type of IP address may be performed based on the request of the application. For example, in a case where the application needs an IP address to be anchored to a core network, the application requests allocation of the permanent IP address from the IP stack. Furthermore, in a case where the application needs an IP address to be anchored to an access network, the application requests allocation of the stable IP address from the IP stack. Moreover, in a case where the application needs an IP address which is not to be anchored to any networks, the application requests allocation of the local IP address from the IP stack. The type of IP address may be determined according to characteristics of the application.

Figure 5:
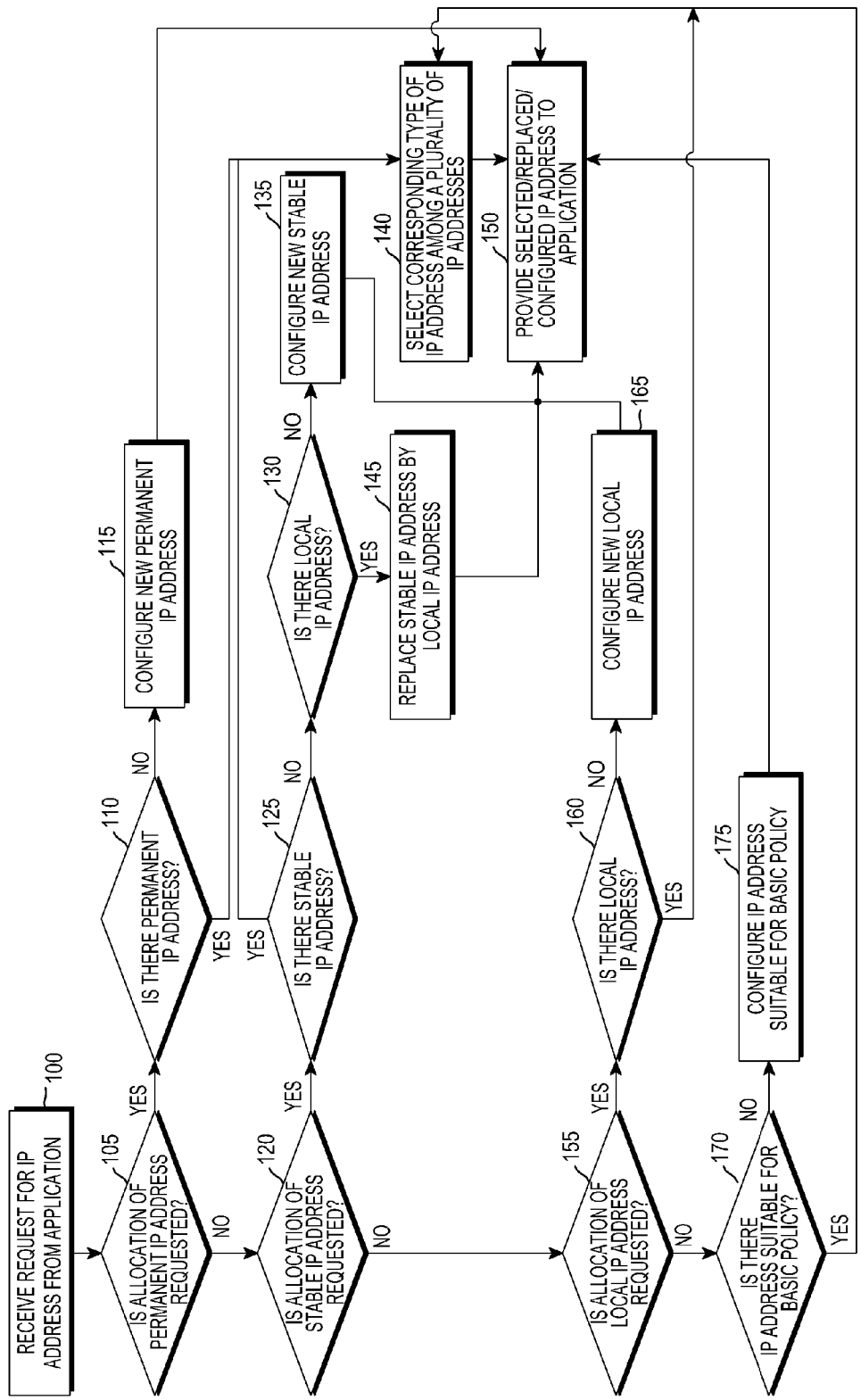
FIG. 5 is a flowchart illustrating a process of allocating an IP address to an application by an IP stack according to an embodiment of the present disclosure.

FIG. 5 is a flowchart illustrating a process of allocating an IP address to an application by an IP stack according to an embodiment of the present disclosure.

Referring to FIG. 5, an IP stack receives an allocation request for an IP address from an application in operation 100. One of three types of IP addresses may be indicated by the allocation request. The IP stack determines whether the allocation request corresponds to an allocation request for a permanent IP address in operation 105, and in a case of the allocation request for the permanent IP address, the IP stack determines whether it has one or more permanent IP addresses in operation 110. If the IP stack has one or more permanent IP addresses, the IP stack selects an IP address to use among the permanent IP addresses in operation 140, and allows the selected IP address to be used by the application in operation 150.

If the permanent IP addresses have never been configured, the IP stack allows a core network anchor manager 35-2 to configure one new permanent IP address in operation 115. The newly configured IP address is made available in the application in operation 150. Meanwhile, when it is determined in operation 105 that the allocation request does not correspond to the allocation request for the permanent IP address, the IP stack determines whether the request from the application corresponds to an allocation request for a stable IP address in operation 120. If the request from the application corresponds to the allocation request for the stable IP address, the IP stack determines whether there are stable IP addresses having an anchor distance shorter than a threshold value. Setting of the threshold value is configured at a specific location of the IP stack. The IP stack does not provide stable IP addresses having a very long anchor distance in view of negative effects of transmission performance. Instead, the IP stack automatically takes a new stable IP address having a short anchor distance.

If the IP stack determines that there are one or more IP addresses which are not too distant (i.e., stable) in operation 125, the IP stack selects one of the stable IP addresses in operation 140, and allows the selected stable IP address to be used by the application in operation 150. If the IP stack determines that there are no stable IP addresses which can be used in operation 125, the IP address determines whether a local IP address has been configured in operation 130. If there is a local IP address, the stable IP address is replaced by the local IP address (i.e., marking the local IP address as the stable IP address), and the IP stack notifies an access network anchor manager 35-1 of the local IP address and displays the local IP address in operation 145. The access network anchor manager 35-1 performs a function of maintaining anchoring of the local IP address while the IP address is being used. The local IP address can be used by the application in operation 150. Meanwhile, if it is determined in operation 130 that there are no local IP addresses, the IP stack configures a stable IP address by using the access network anchor manager 35-1 in operation 135, and allows the stable IP address to be used by the application in operation 150.

Meanwhile, if it is determined in operation 155 that the request from the application corresponds to an allocation request for a local IP address, the IP stack determines whether the local IP address has already been configured in operation 160. If there are one or more local IP addresses, the IP stack selects one of them in operation 140 and allows the selected local IP address to be used by the application in operation 150. If it is determined in operation 160 that there are no local IP addresses, the IP stack configures a new local IP address in operation 165, and allows the configured local IP address to be used by the application in operation 150.

Furthermore, if it does not matter which type of IP address is to be allocated in operation 155, the IP stack confirms a basic policy for instructing which type of IP address must be allocated in this case in operation 170. If there are one or more IP addresses suitable for the basic policy, the IP stack selects one of the IP addresses suitable for the basic policy in operation 140, and allows the selected IP address to be used by the application in operation 150. Meanwhile, if it is determined in operation 170 that there no IP addresses suitable for the basic policy, the IP stack configures one IP address by using the core network anchor manager 35-2 or the access network anchor manager 35-1 in operation 175, and allows the configured IP address to be used by the application in operation 150.

Figure 6:
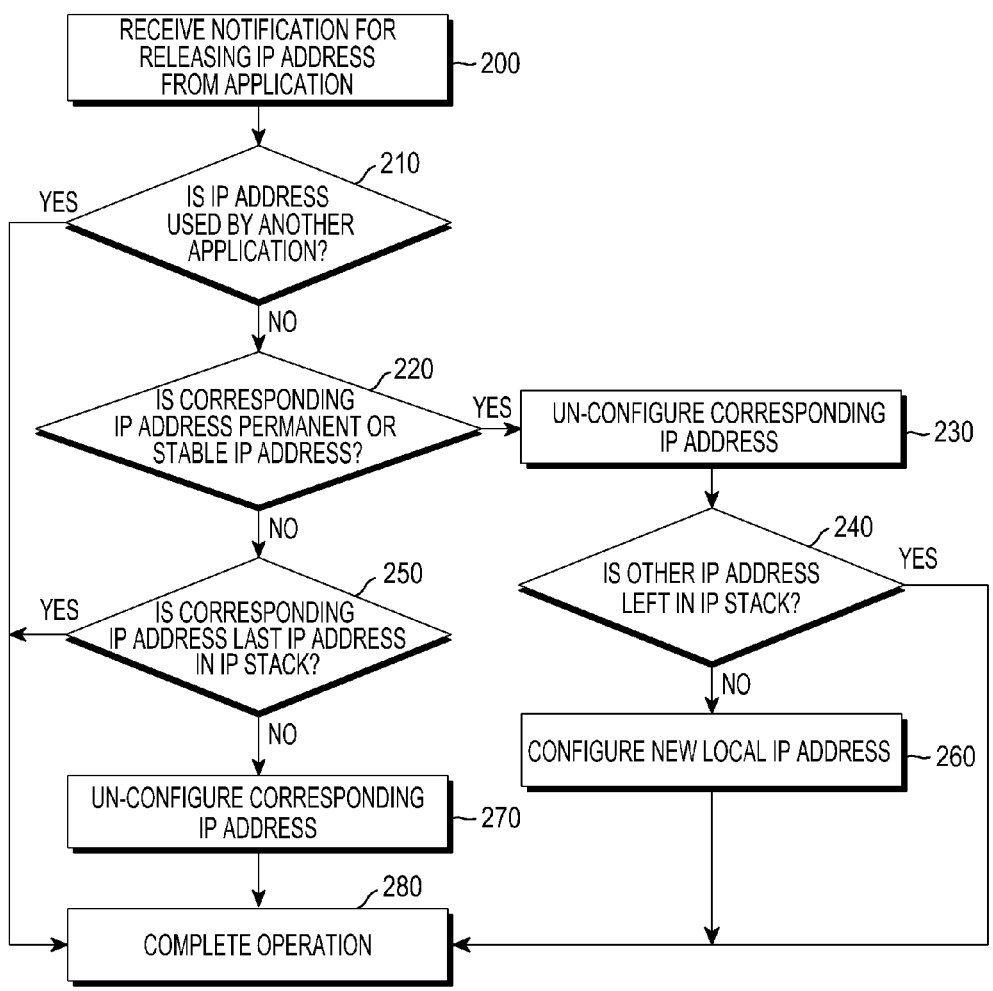
FIG. 6 is a flowchart illustrating a process of un-configuring an IP address by an IP stack according to an embodiment of the present disclosure.

FIG. 6 is a flowchart illustrating a process of un-configuring (or releasing) an IP address by an IP stack according to an embodiment of the present disclosure.

Referring to FIG. 6, an IP stack receives a notification/request from an application in order to un-configure (or release) a specific IP address in operation 200. The notification informs that the application is executed using the IP address. In response, the IP stack has to determine what to do using the IP address. An operation of the IP stack depends on the type of IP address and a presence of another application using the IP address.

In operation 210, the IP stack determines whether the IP address is used by another application at that time. If the IP address is used by another application, the IP stack proceeds to operation 280 to perform no operations and thus, the process of un-configuring the IP address is terminated. In other words, the IP address is not excluded from a configuration. Meanwhile, if it is determined in operation 210 that there are no applications using the corresponding application, the IP stack determines whether the corresponding IP address is a permanent IP address or a stable IP address in operation 220. If it is determined in operation 220 that the corresponding IP address is the permanent IP address of the stable IP address, the IP stack performs an operation of excluding (i.e., un-configuring) the corresponding IP address through a core network anchor manager 35-2 or an access network anchor manager 35-1 according to the type of IP address in operation 230.

Operation 230 is necessary since the IP address is anchored and is in progress in an anchor node (BS/AR or HA/PGW). This state needs to be cleared and the clearing is performed by the core network anchor manager 35-2 or the access network anchor manager 35-1. In operation 240, the IP stack determines whether other IP addresses are left in the stack in which the anchored IP address is excluded once. If other IP addresses are left in the stack, the IP stack proceeds to operation 280 to perform no operations and thus, the process of un-configuring the IP address is terminated. If it is determined in operation 240 that there are no IP addresses left, the IP stack configures a new local IP address in operation 260.

Meanwhile, when it is determined in operation 210 that the corresponding IP address is not used by the another application and it is determined in operation 220 that the corresponding IP address is not the permanent IP address or the stable IP address (i.e., if the corresponding IP address is the local IP address), the IP stack determines whether the corresponding IP address is the last IP address in the IP stack in operation 250. If the corresponding IP address is the last IP address, the IP stack proceeds to operation 280 to perform no operations and thus, the process of un-configuring the IP address is terminated. If the corresponding IP address is not the last IP address, the corresponding IP address is excluded from the configuration by the IP stack in operation 270.

Figure 7:
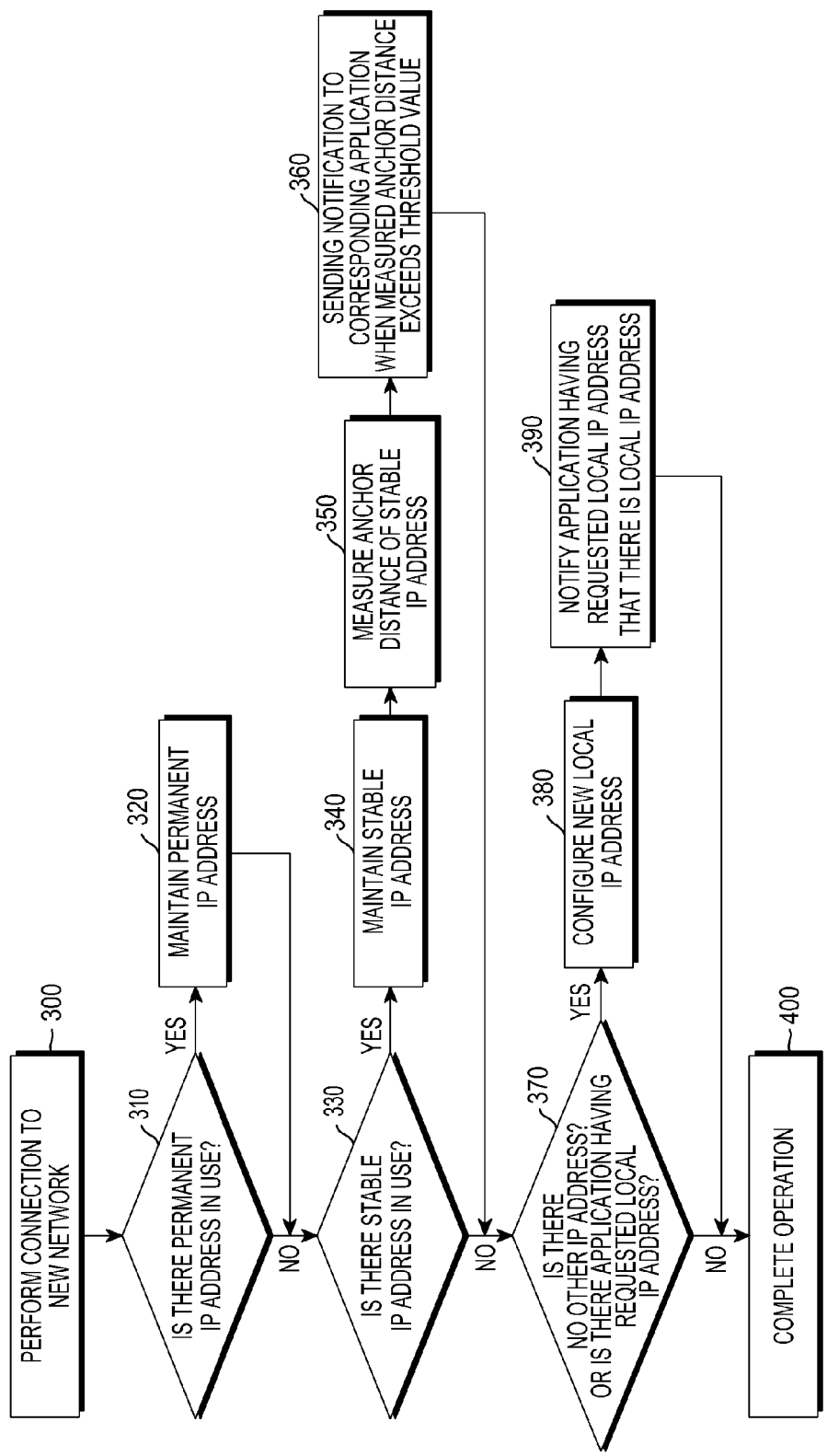
FIG. 7 is a flowchart illustrating a process of sending a notification to an application by an IP stack when a mobile station moves from one node to another node according to an embodiment of the present disclosure.

FIG. 7 is a flowchart illustrating a process of sending a notification to an application by an IP stack when a mobile station moves from one node to another node according to an embodiment of the present disclosure.

Referring to FIG. 7, in operation 300, a mobile station performs a connection to a new network, and a point of attachment of the mobile station is changed. In operation 310, an IP stack determines whether a permanent IP address has been configured. If the permanent IP address exists, the IP stack operates a core network anchor manager 35-2 to perform processes of maintaining the permanent IP address in operation 320. Thereafter, in operation 330, the IP stack determines whether a stable IP address has been configured. If it is determined in operation 330 that the stable IP address exists, the IP stack operates an access network anchor manager 35-1 to perform processes of maintaining the stable IP address in operation 340. If an application has been registered as a trigger for an anchor distance of the given stable IP address, the IP stack measures the anchor distance of the stable IP address in operation 350. If one of the measured anchor distance values exceeds a registered threshold value, the IP stack sends a notification to the corresponding application in operation 360. Meanwhile, if it is determined in operation 310 that the permanent IP address does not exist and it is determined in operation 330 that the stable IP address does not exist, the IP stack determines which IP address has been configured or which application has requested a local IP address, in operation 370. If one of the identification steps is determined as 'Yes', the IP stack configures a new local IP address in operation 380. In operation 390, the IP stack notifies the application having requested the local IP address that there is the new local IP address. After the above-described process is performed, the operations are terminated in operation 400.

If the existing applications which do not support the new API according to the various embodiments of the present disclosure are used in the IP stack of the present disclosure, a method of determining how to process the existing applications is required. The processing method may be determined by the mobile station or in conjunction with a method obtained from a communication network operator. For example, a method of providing permanent IP addresses to the existing applications may be considered as one available method. In another available method, local IP addresses may be provided. Furthermore, a method of providing stable IP addresses may also be considered as another available method.

In addition, the IP stack may distinguish the applications through individual identification, and may also determine the processing method for each of the applications. If the IP stack knows or detects that the applications need a permanent IP address (even though the necessity may not be displayed since the existing applications do not support the new API), the IP stack may process the existing applications as if the existing applications had requested the permanent IP address. In the same way, the IP stack may process the corresponding application as if the corresponding application had requested a stable IP address or a local IP address.

The various embodiments of the present disclosure may be applied to an IP based wireless communication system. In implementing the various embodiments of the present disclosure, support from the communication network elements BS, AR, HA, and PGW is not required. Furthermore, the present disclosure may be implemented and operated in the mobile station. The new API proposed by the present disclosure needs to be maintained by the application. Even though an application does not implement the new API likewise to the existing applications, the present disclosure may be still carried out as described above. Considering that the technology according to the present disclosure reduces Capital Expenditure (CAPEX) and Operating Expenditure (OPEX) of mobile communication network operators, it is expected that the present disclosure is useful for application developers and thereby, appropriate usage of the present disclosure is to be promoted.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of managing mobility in an Internet Protocol (IP) based network by a mobile station, the method comprising:
    detecting, by the mobile station, a request for allocation of an IP address from an application included in the mobile station;
    determining, by the mobile station, a type of the IP address to be allocated to the application based on the request; and
    allocating, by the mobile station, the IP address of the determined type to the application, wherein the type of the IP address is determined based on a network to which the IP address to be allocated to the application is anchored, wherein the IP address of the determined type includes one of a first-type IP address anchored to a core network, a second-type IP address anchored to an access network, and a third-type IP address which is not anchored to any network, and wherein the second-type IP address is allocated to the application in response that an anchor distance is shorter than a threshold value, and the second-type IP address is maintained in another access network in response that the mobile station is handed over from the access network to the another access network.

2. The method of claim 1, further comprising:
configuring, by the mobile station, the IP address of the determined type in response that the IP address of the determined type does not exist in an IP stack.

3. The method of claim 1, wherein the type of the IP address is determined depending on characteristics of the application.

4. The method of claim 1, further comprising:
detecting, by the mobile station, a notification for un-configuring the allocated IP address from the application; and
un-configuring, by the mobile station, the allocated IP address in response that the allocated IP address is the first-type IP address or the second-type IP address.

5. The method of claim 4, further comprising:
newly configuring, by the mobile station, the third-type IP address in response that no IP address is left after un-configuring the allocated IP address.

6. The method of claim 1, further comprising:
replacing, by the mobile station, the third-type IP address by the second-type IP address in response that allocation of the second-type IP address is requested from the application and the second-type IP address does not exist in an IP stack.

7. The method of claim 1, wherein the IP address of the determined type is anchored regardless of mobility and a location of the mobile station.

8. A mobile station for managing mobility in an Internet Protocol (IP) based network, the mobile station comprising:
an IP stack configured to:
detect a request for allocation of an IP address from an application included in the mobile station,
determine a type of the IP address to be allocated to the application based on the request, and
allocate the IP address of the determined type to the application; and
a mobile Application Programming Interface (API) arranged between the IP stack and the application,
wherein the type of the IP address is determined based on a network to which the IP address to be allocated to the application is anchored,
wherein the IP address of the determined type includes one of a first-type IP address anchored to a core network, a second-type IP address anchored to an access network, and a third-type IP address which is not anchored to any network, and
wherein the second-type IP address is allocated to the application in response that an anchor distance is shorter than a threshold value, and the second-type IP address is maintained in another access network in response that the mobile station is handed over from the access network to the another access network.

9. The mobile station of claim 8, wherein the IP stack configures the IP address of the determined type in response that the IP address of the determined type does not exist in an IP stack.

10. The mobile station of claim 8, wherein the type of the IP address is determined depending on characteristics of the application.

11. The mobile station of claim 8, wherein the IP stack detects a notification for un-configuring the allocated IP address from the application, and un-configures the allocated IP address in response that the allocated IP address is the first-type IP address or the second-type IP address.

12. The mobile station of claim 11, wherein the IP stack newly configures the third-type IP address in response that no IP address is left after un-configuring the allocated IP address.

13. The mobile station of claim 8, wherein the IP stack replaces the third-type IP address by the second-type IP address in response that allocation of the second-type IP address is requested from the application and the second-type IP address does not exist in an IP stack.

14. The mobile station of claim 8, wherein the IP address of the determined type is anchored regardless of mobility and a location of the mobile station.

15. A non-transitory computer-readable recording medium for implementing a program of instructions which, when executed by at least one processor of a mobile station, cause the at least one processor to perform operations, comprising:
detecting, by the mobile station, a request for allocation of an IP address from an application included in the mobile station;
determining, by the mobile station, a type of the IP address to be allocated to the application based on the request; and
allocating, by the mobile station, the IP address of the determined type to the application,
wherein the type of the IP address is determined based on a network to which the IP address to be allocated to the application is anchored,
wherein the IP address of the determined type includes one of a first-type IP address anchored to a core network, a second-type IP address anchored to an access network, and a third-type IP address which is not anchored to any network, and
wherein the second-type IP address is allocated to the application in response that an anchor distance is shorter than a threshold value, and the second-type IP address is maintained in another access network in response that the mobile station is handed over from the access network to the another access network.

16. The non-transitory computer-readable recording medium of claim 15, further comprising:
configuring, by the mobile station, the IP address of the determined type in response that the IP address of the determined type does not exist in an IP stack.

17. The non-transitory computer-readable recording medium of claim 15, wherein the type of the IP address is determined depending on characteristics of the application.

18. The non-transitory computer-readable recording medium of claim 15, further comprising:
detecting, by the mobile station, a notification for un-configuring the allocated IP address from the application; and
un-configuring, by the mobile station, the allocated IP address in response that the allocated IP address is the first-type IP address or the second-type IP address.

19. The non-transitory computer-readable recording medium of claim 18, further comprising:
   newly configuring, by the mobile station, the third-type IP address in response that no IP address is left after un-configuring the allocated IP address.

20. The non-transitory computer-readable recording medium of claim 15, further comprising:
   replacing, by the mobile station, the third-type IP address by the second-type IP address in response that allocation of the second-type IP address is requested from the application and the second-type IP address does not exist in an IP stack.

21. The non-transitory computer-readable recording medium of claim 15, wherein the IP address of the determined type is anchored regardless of mobility and a location of the mobile station.

\* \* \* \* \*